(12) United States Patent
Brunon

(10) Patent No.: US 6,216,718 B1
(45) Date of Patent: Apr. 17, 2001

(54) CONTROL VALVES FOR MOTOR VEHICLE HYDRAULICALLY-ASSISTED STEERING

(75) Inventor: Christian Brunon, Dargoire (FR)

(73) Assignee: Societe de Mecanique d'Irigny, Irigny (FR)

( * ) Notice: Subject to any disclaimer, the term of this patent is extended or adjusted under 35 U.S.C. 154(b) by 0 days.

(21) Appl. No.: 09/347,639

(22) Filed: Jul. 6, 1999

(30) Foreign Application Priority Data

Jul. 9, 1998 (FR) .................................................. 9808998

(51) Int. Cl.$^7$ ...................................................... F16B 19/02
(52) U.S. Cl. ................ 137/15.18; 91/375 A; 137/625.23
(58) Field of Search ........................... 91/375 A, 375 R; 137/625.23, 15.18, 15.17, 315.17, 315.09

(56) References Cited

U.S. PATENT DOCUMENTS 5,109,753 * 5/1992 Kobayashi .......................... 91/375 A
5,427,134 * 6/1995 Tiedman ......................... 91/375 A X
5,562,016 * 10/1996 Schoffel ............................. 91/375 A

FOREIGN PATENT DOCUMENTS

2238845 * 6/1991 (GB) ................................. 91/375 A

* cited by examiner

*Primary Examiner*—John Rivell
*Assistant Examiner*—Meredith H Schoenfeld
(74) *Attorney, Agent, or Firm*—Herbert Dubno

(57) ABSTRACT

The method makes it possible, in the context of the industrial-scale production of control valves, to reduce the spread on the torque of the valve law P=f(C) which spread is due to machining inaccuracies and other variations in geometric parameters.

This method consists, for each control valve produced, in adapting the stiffness of the torsion bar and/or of the connection between this bar and the spool of the control valve, according to the difference between the valve law measured for this valve and the theoretical law for the type of valve concerned. In particular, adaptation can be achieved by selecting the axial position of the pin that connects the torsion bar and the spool so as to modify the torsion length of this bar.

11 Claims, 3 Drawing Sheets

CONTROL VALVES FOR MOTOR VEHICLE HYDRAULICALLY-ASSISTED STEERING

BACKGROUND OF THE INVENTION

The present invention relates to control valves for motor vehicle hydraulically-assisted steering. More specifically, this invention relates to a method which makes it possible, in the context of the industrial-scale production of such control valves, to reduce the spread on the torque of the "valve law".

DESCRIPTION OF THE PRIOR ART

FIG. 1 of the appended diagrammatic drawing depicts, in longitudinal section, a conventional control valve (such as the one disclosed, for example, in French patent application No. 2752809 or its European equivalent No. 0827892 in the name of the Applicant Company), as a reminder of the structure and operating principle, and to explain the problem underlying the present invention.

The control valve comprises, arranged along its longitudinal axis 1, a pinion 2 which is designed to mesh permanently with a rack (not depicted) of the power-assisted steering. A torsion bar 3, arranged along the longitudinal axis 1, is connected to the pinion 2 by a rigid connection 4, at one end of this torsion bar 3. A spool 5, of tubular overall shape, mounted around the torsion bar 3, is centered by one of its ends in the pinion 2, via a bearing 6 which allows it a certain degree of angular travel under no stress, but which travel is limited by a positive stop (not depicted) provided between this spool 5 and the pinion 2. The spool 5 is centered, at its other end, on the torsion bar 3 and is rigidly connected thereto, near this end, by a connecting element, particularly a pin 7.

A sleeve 8 partially surrounding the spool 5, is centered on this spool 5 and angularly connected to the pinion 2 by another pin 9. Complementary hydraulic fluid control grooves 10, 11 are formed in the sleeve 8 and in that region of the spool 5 which is covered by the sleeve 8, so as to allow the hydraulic fluid to pass to one or other of the chambers of the hydraulically-assisted steering ram. In operation, the relative angular positions of the grooves 10, 11 define variable passage cross sections for the hydraulic fluid.

More specifically, when the control valve is in operation, a resistive torque (resulting from the adhesion of the wheels of the vehicle and transmitted through the rack) is exerted on the pinion 2 and an input torque originating from the vehicle steering wheel is exerted on the spool 5. These two torques are in opposite direction, and they place load on the torsion bar 3, leading to an angular offset between the spool 5 on the one hand, and the sleeve 8 (angularly connected to the pinion 2) on the other hand. This angular offset opens the hydraulic passage to one chamber of the ram in proportion to the resultant torque, at the same time as the opposite chamber is placed in communication with the hydraulic return circuit. The pressure of the hydraulic fluid conveyed to one of the ram chambers, and known as the "assistance pressure" increases as the angular offset becomes greater, and is therefore an increasing function of the torque applied to the control valve.

The way the control valve operates is characterized by a "control valve law" which is the law P=f(C) of the variation in assistance pressure as a function of torque, represented by the curve in FIG. 2.

To determine the control valve law, the pinion 2 is prevented from rotating by a rigid device, and a torque is applied to the spool 5 in the clockwise direction and then in the counterclockwise direction, this respectively corresponding to the vehicle turning to the right and to the vehicle turning to the left. While torque is being applied to the spool 5, the pressure in the corresponding hydraulic circuit increases. It is this hydraulic pressure which is measured, as a function of the torque applied to the spool 5, the measurement points thus determined defining the curve and therefore the control valve law.

For a control valve of a given type, this law is determined, in particular, by the characteristics of the torsion bar 3 which acts as a spring and allows the torque needed to angularly offset the spool 5 with respect to the sleeve 8 to be adapted in order to meet the motor manufacturers' specifications. This characteristic of the torsion bar 3 is known as the angular stiffness; it depends on the geometry of the said torsion bar and therefore on the various diameters and lengths which geometrically define this bar.

The torsion length of the torsion bar 3, that is to say the axial distance between the rigid connection 4 with the pinion 2 and the pinned connection (by pin 7) with the spool 5 also affect the ultimate stiffness of the torsion bar 3. This length is a predefined dimension D which depends, in particular, on the axial position of the pin 7 on the spool 5 and the torsion bar 3. In the current state of the art, the pin 7, for a given control valve, has a single axial position and therefore an unvarying position. The machining needed (simultaneous diametral drilling of the torsion bar 3 and of the spool 5) to push the pin 7 in at its predefined position is achieved, when the control valve is being assembled, after a hydraulic regulation has been performed in order to obtain a valve law curve which is identical (symmetric) for turns to the right and turns to the left.

However, as illustrated by the dotted lines in FIG. 2, there is, for a set of theoretically identical control valves, a spread on the values of torque for a given pressure. Put another way, for the same pressure P, the applied torque C may be higher or lower, because of machining inaccuracies and other variations in geometric or assembly parameters that affect the hydraulic passage cross sections and the stiffness of the torsion bar 3. In particular, the inaccuracies in the machining of the hydraulic fluid. control grooves 10, 11, which are the result of the limitations of the industrial machining facilities used, have a direct influence on the spread of the valve law. The geometry of the torsion bar 3 and the torsion length D of this bar also exhibit variations which influence the stiffness of the said torsion bar and therefore the spread in the valve law. A combination of these causes leads to a not insignificant amount of spread, as illustrated by FIG. 2.

SUMMARY OF THE INVENTION

The present invention sets out to avoid the drawbacks of such a spread on the control valve law, and its purpose is therefore to greatly reduce the spread on torque to obtain practically the same assistance pressure on a significant number of valves produced on an industrial scale.

To this end, the subject of the invention is a method for reducing the spread on the torque of a control valve for motor vehicle hydraulically-assisted steering, the method consisting, for each control valve produced, in adapting the stiffness of the torsion bar and/or of the connection between this torsion bar and the spool of the control valve according to the difference between the valve law or power-assistance law measured for this valve and the theoretical law for the type of control valve concerned.

Thus, the inventive step consists in adapting or modifying particularly the stiffness of the torsion bar according to the observed difference between the measured valve law and the theoretical law, so as to "recenter" the actual valve law as best possible with respect to the desired theoretical law. As this operation is repeated individually for each control valve produced, this solution makes it possible to reduce the spread on the valve law across an entire industrial-scale production run of some arbitrary size.

In the context of the present invention, adaptation may be achieved in various ways, possibly combined with each other.

In a first embodiment of the method that is the subject of the invention, the stiffness of the torsion bar is adapted by selecting the axial position of the pin that connects this torsion bar with the spool of the control valve, so as to alter the torsion length of said torsion bar. In the context of this embodiment, it is, in particular, conceivable to predefine a number of axial positions of the pin that connects the torsion bar and the spool, each axial position corresponding to a different torsion length of the torsion bar, and to position the connecting pin, for each control valve, in that one of the predefined axial positions which is closest to the ideal position. In an alternative, a range for continuous adjustment of the axial position of said connecting pin is predefined, and for each control valve, this connecting pin is axially positioned, within the range of adjustment, in the calculated ideal position.

According to another possibility, the stiffness of the torsion bar is adapted by producing on this torsion bar one or more annular grooves which locally reduce its cross section and thus cause a reduction in stiffness.

The possibilities mentioned above may be combined, particularly by contriving for stiffness-reducing grooves to be produced on the torsion bar between the various predefined axial positions of the connecting pin.

In yet another possibility, each control valve is adapted by using, to connect the torsion bar and the spool, a connecting element whose own stiffness can be modified. In practice, such adaptation will be achieved by making selective use of a solid or hollow connecting pin, or by choosing the type of pin used here.

In any event, an individual measurement needs to be made on each control valve prior to adapting this control valve in terms of stiffness. To this end, the valve law or power-assistance law is measured, for each control valve, before the pin that connects the torsion bar and the spool is fitted, temporarily making this connection using a fixture external to the control valve, the result of this measurement being compared with the theoretical law in order to command a fixture for adapting the stiffness of the torsion bar and/or of the connection between this torsion bar and the spool. The fixture which temporarily connects the torsion bar and the spool advantageously consists of a clamping unit comprising jaws acting on the external end of the torsion bar and on the corresponding end of the spool. As to the fixture for adapting the stiffness of the torsion bar and/or of the connection between this torsion bar and the spool, this fixture may be produced in the form of a drilling and pinning unit which can be displaced in the axial direction of the control valve, to adapt the axial position of the connecting pin. Of course, this unit must also adapt the angular position of the pin, to make it correspond to the neutral point of the control valve.

BRIEF DESCRIPTION OF THE DRAWINGS

In any event, the invention will be better understood with the aid of the description which follows, referring to the appended diagrammatic drawing which illustrates, by way of example, some embodiments of this method for reducing the spread on torque of a control valve for hydraulically-assisted steering.

DESCRIPTION OF THE PREFERRED EMBODIMENT

Figure 1:
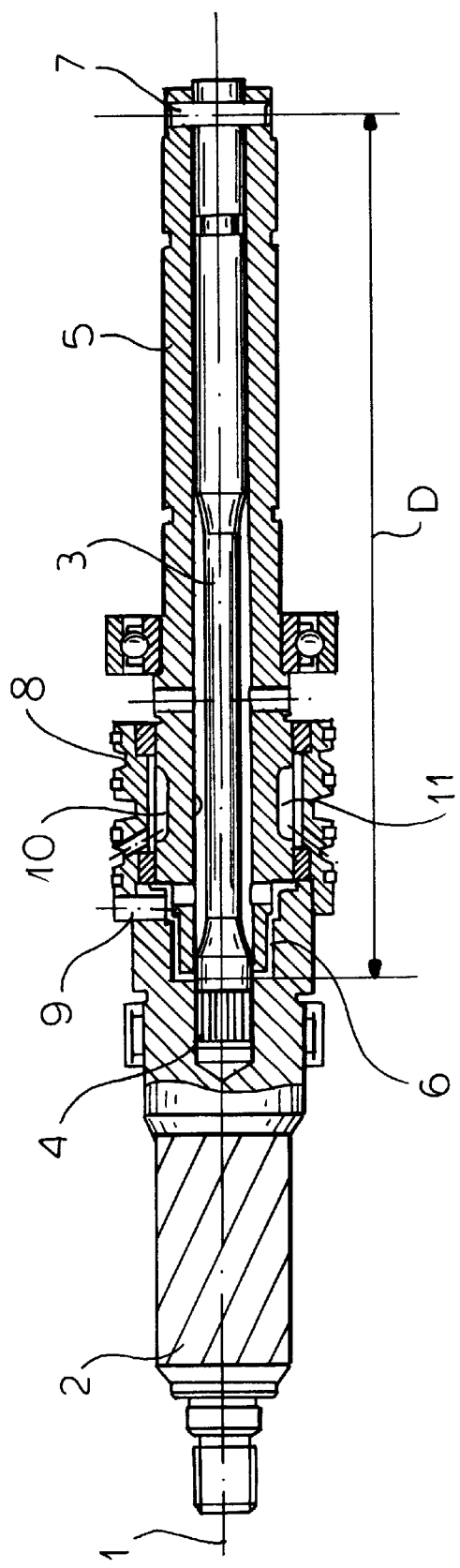
FIG. 1 (already mentioned) is a view in longitudinal section of a conventional control valve.
Figure 2:
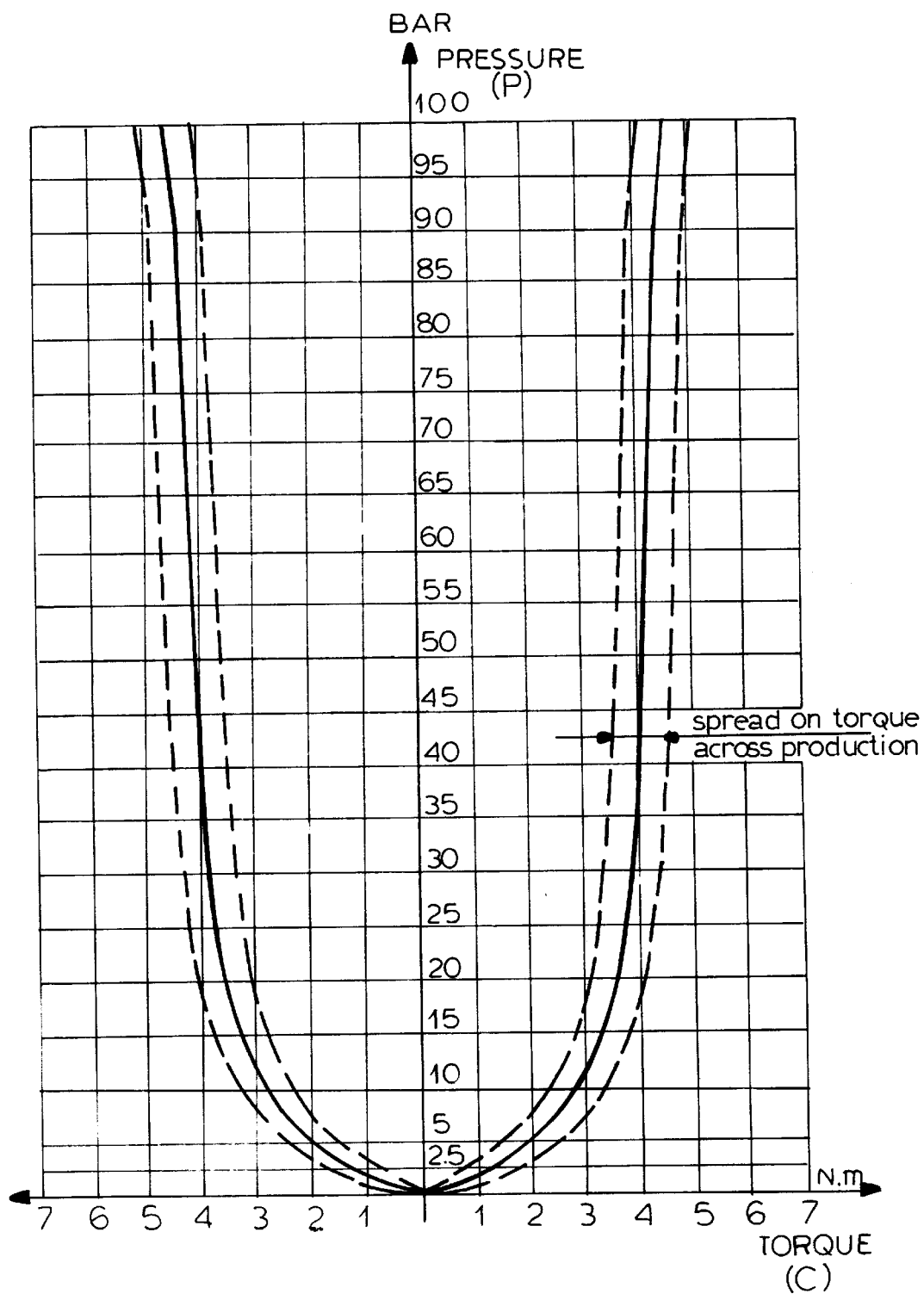
FIG. 2 (already mentioned) shows the curve that represents the control valve law, for such a valve.
Figure 3:
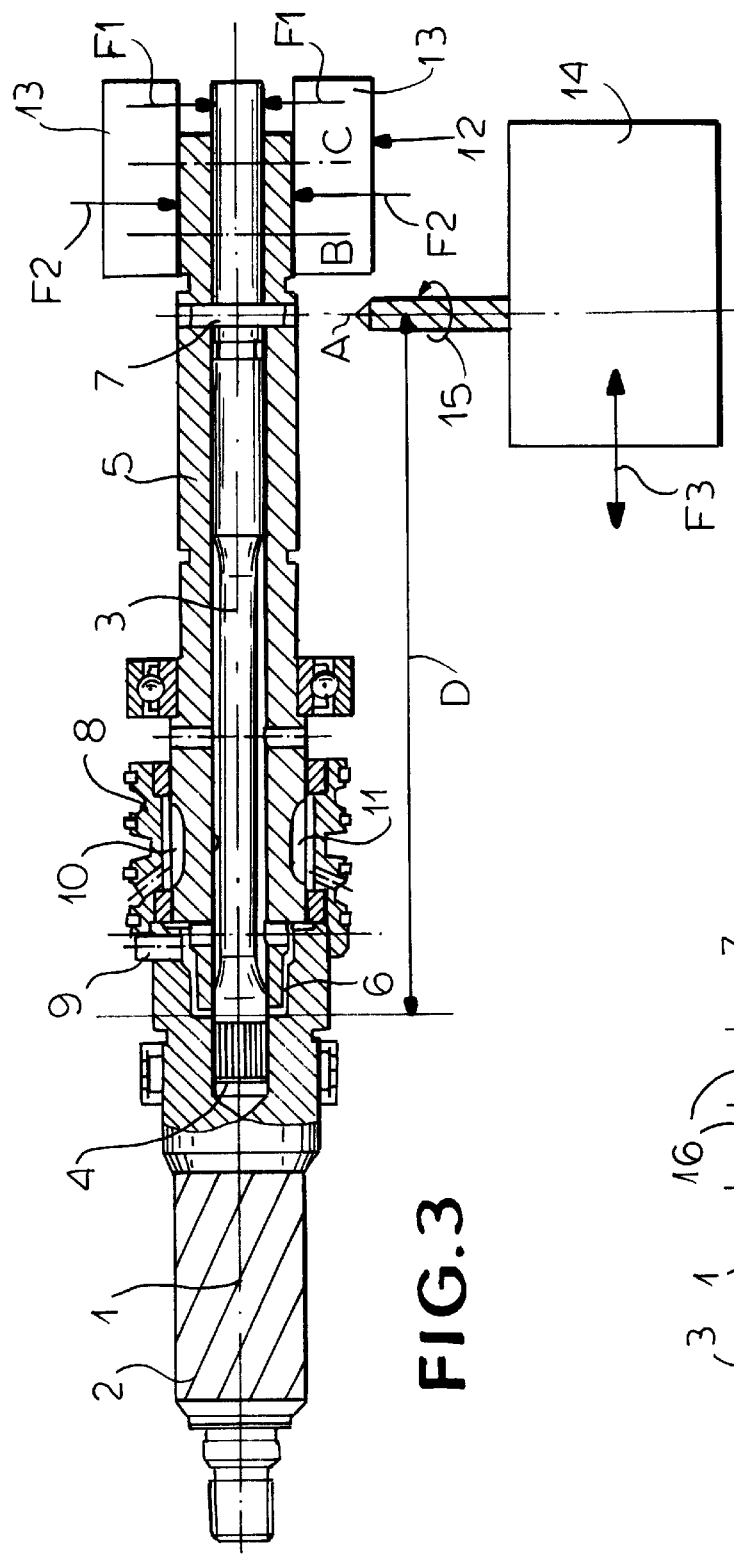
FIG. 3 is a view in longitudinal section of a control valve while it is being adapted by the method that is the subject of the present invention, with an indication of the fixtures used to implement this method.

A control valve is depicted again in FIG. 3, the structural elements which correspond to those described previously (with reference to FIG. 1) being denoted by the same numerical references and requiring no further description.

As shown in the right-hand part of FIG. 3, the invention provides for three separate axial positions labeled A, B and C respectively, for positioning the pin 7 which is to make the connection between the torsion bar 3 on the one hand and the spool 5 on the other hand. The control valve is adapted, with a view to achieving the desired valve law, by choosing for the pin 7, from the three predefined positions A, B and C, the position which is closest to the ideal position. As will be readily understood, this choice of position makes it possible to modify the torsion length D of the torsion bar 3 between its rigid connection 4 with the pinion 2 and the pin 7, and hence adapt the overall stiffness of the torsion bar 3.

More specifically, this adaptation is achieved as follows:

Before the connecting pin 7 is fitted, a fixture 12 external to the control valve is used to temporarily make a rigid connection between the external end of the torsion bar 3 and the corresponding end of the spool 5. The fixture 12 consists of a clamping assembly comprising jaws 13 acting on the respective ends of the torsion bar 3 and the spool 5, as indicated by the arrows F1 and F2. While the fixture 12 is providing this connection, with the jaws 13 clamped tight, an initial measurement of the valve law P=f(C) is taken and a comparison made between the measured valve law and the theoretical law.

Depending on the observed difference, for each control valve, between the measured valve law and the theoretical law, the modification needed to the stiffness of the torsion bar 3 is calculated and the position of a drilling and pinning unit 14, that can be displaced parallel to the longitudinal axis 1 of the control valve, in the direction of the double-headed arrow F3 and which is equipped with a drilling tool 15 is adapted. Thus, the tool 15 is brought into register with one of the three predefined positions A, B and C, for example the position A (FIG. 3) or the position C (FIG. 4), before being actuated to make it simultaneously drill through the spool 5 and the torsion bar 3. The connecting pin 7 is finally pressed into the drilling made, and thus occupies the most appropriate position.

As an alternative, instead of discrete positions A, B and C, the axial position of the connecting pin 7 may also be continuously adjusted, within a predefined range of adjustment, for example a range extending from the extreme position A to the other extreme position C.

Figure 4:
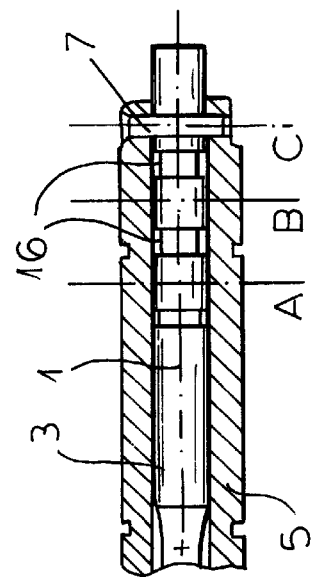
FIG. 4 is a partial view, in longitudinal section, of a similar valve, illustrating an alternative form of this method.

In another alternative form, or in addition to the foregoing, and as illustrated in FIG. 4, the overall stiffness of the torsion bar 3 is adapted by forming annular grooves 16 on this torsion bar 3, the grooves 16 locally reducing the cross section of said bar 3. The grooves 16 are cut here between the various predefined axial positions A, B and C of the connecting pin 7.

As goes without saying, the invention is not restricted merely to the embodiments of this method of reducing the spread on torque of a control valve which have been described hereinabove by way of example; on the contrary, it encompasses all alternative embodiments and applications thereof that follow the same principle. In particular, it would not be departing from the scope of the invention if:

- more or fewer predefined axial positions for the pin 7 that connects the torsion bar 3 and the spool 5 were envisaged;
- any appropriate shape was envisaged for the grooves 16 for reducing the stiffness of the torsion bar;
- the desired adaptation was achieved by using the choice of pin 7 for connecting the torsion bar 3 and the spool 5, instead of selecting the axial position of the pin 7, or were used in combination with this selection of axial position;
- the method was implemented with fixtures other than those described and illustrated;
- this method was intended for control valves for hydraulically-assisted steering, the shape or structure detail of which differed from the example illustrated in the drawing.

What is claimed is:

1. A method for reducing the spread on the torque of a control valve for motor vehicle hydraulically-assisted steering, the control valve comprising, arranged along its longitudinal axis, a pinion that is designed to mesh with a power-assisted steering rack, a torsion bar connected to the pinion by a rigid connection at one end, a tubular spool mounted around the torsion bar and connected to the other end of said torsion bar by a connecting element, particularly a pin, and a sleeve partially surrounding the spool and connected angularly to the pinion, hydraulic fluid control grooves being formed in the sleeve and in the corresponding region of the spool, which method consists, for each control valve produced, in adapting the stiffness of the torsion bar and/or of the connection between this torsion bar and the spool of the control valve according to the difference between the valve law or power-assistance law measured for this valve and the theoretical law for the type of control valve concerned.

2. A method as claimed in claim 1, wherein the stiffness of the torsion bar is adapted by selecting the axial position of the pin that connects this torsion bar with the spool of the control valve, so as to alter the torsion length of said torsion bar.

3. A method as claimed in claim 2, wherein there are a number of predefined axial positions of the pin that connects the torsion bar and the spool, each axial position corresponding to a different torsion length of the torsion bar, and wherein the connecting pin is positioned, for each control valve, in that one of the predefined axial positions which is closest to the ideal position.

4. A method as claimed in claim 2, wherein there is a predefined range of continuous adjustment of the axial position of the connecting pin and wherein, for each control valve, this connecting pin is axially positioned, within the adjustment range, in the calculated ideal position.

5. A method as claimed in claim 1, wherein the stiffness of the torsion bar is adapted by producing on this torsion bar one or more annular grooves which locally reduce its cross section and thus cause a reduction in stiffness.

6. A method as claimed in claim 3, wherein the stiffness-reducing grooves are produced on the torsion bar between the various predefined axial positions of the connecting pin.

7. A method as claimed in claim 1, wherein each control valve is adapted by using, to connect the torsion bar and the spool, a connecting element whose own stiffness can be modified.

8. A method as claimed in claim 7, wherein adaptation is achieved by making selective use of a solid or a hollow connecting pin, or by choosing the type of pin used.

9. A method as claimed in claim 1, wherein the valve law or power-assistance law is measured, for each control valve, before the pin that connects the torsion bar and the spool is fitted, temporarily making this connection using a fixture external to the control valve, the result of this measurement being compared with the theoretical law in order to command a fixture for adapting the stiffness of the torsion bar and/or of the connection between this torsion bar and the spool.

10. A method as claimed in claim 9, wherein the fixture which temporarily connects the torsion bar and the spool consists of a clamping unit comprising jaws acting on the external end of the torsion bar and on the corresponding end of the spool.

11. A method as claimed in claim 2, wherein the fixture for adapting the stiffness of the torsion bar and/or of the connection between this torsion bar and the spool is produced in the form of a drilling and pinning unit which can be displaced in the axial direction of the control valve, to adapt the axial position of the connecting pin.

* * * * *